(12) United States Patent
Cutlip

(10) Patent No.: US 6,976,027 B2
(45) Date of Patent: Dec. 13, 2005

(54) IMPLEMENTING GEOGRAPHICAL TAXONOMY WITHIN NETWORK-ACCESSIBLE SERVICE REGISTRIES USING SPATIAL EXTENSIONS

(75) Inventor: Robert R. Cutlip, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/224,896

(22) Filed: Aug. 21, 2002

(65) Prior Publication Data

US 2004/0039738 A1   Feb. 26, 2004

(51) Int. Cl.$^7$ ............................................. G06F 17/30
(52) U.S. Cl. ........................... 707/101; 707/3; 707/10; 701/208; 711/216
(58) Field of Search .......................... 707/3–6, 10, 100, 707/101; 701/200, 208; 711/216

(56) References Cited

U.S. PATENT DOCUMENTS

| | | | | |
|---|---|---|---|---|
| 6,148,289 | A | | 11/2000 | Virdy .............................. 705/1 |
| 6,157,923 | A | | 12/2000 | Ivler et al. ...................... 707/3 |
| 6,363,392 | B1 | * | 3/2002 | Halstead et al. ............ 707/102 |
| 2002/0122055 | A1 | * | 9/2002 | Parupudi et al. ............ 345/737 |
| 2003/0172127 | A1 | * | 9/2003 | Northrup et al. ........... 709/219 |
| 2003/0220835 | A1 | * | 11/2003 | Barnes ......................... 705/14 |
| 2004/0213409 | A1 | * | 10/2004 | Murto et al. ................ 380/258 |

OTHER PUBLICATIONS

Dogac et al., "An ebXML infrastructure implementation through UDDI registries and RosettaNet PIPs", Proceedings of the 2002 ACM SIGMOD international conference on Management of data, Jun. 4-6, 2002, pp. 512-523.*

UDDI tModels "Classification Schemes, Taxonomies, Identifier Systems, and Relationships" Nov. 15, 2001, http://uddi.org/taxonomies/UDDI_Taxonomy_tModels.htm, pp. 1-21.

UDDI Core tModels "Taxonomy and Identifier Systems" Open Draft Aug. 23, 2001, http://uddi.org/taxonomies/Core_Taxonony_OverviewDoc.htm, pp. 1-17.

"Web Service Description and Discovery Using UDDI, Part II", Scott Seely, Microsoft Corporation, Oct. 17, 2001, http//msdn.microsoft.com/library/en-us/dnservice/html/service10172001.asp?frame=true, pp. 1-7.

* cited by examiner

*Primary Examiner*—Khanh Pham
(74) *Attorney, Agent, or Firm*—Marcia L. Doubet; Gerald R. Woods

(57) ABSTRACT

Techniques are disclosed for using geographical taxonomy data in network-accessible registries (such as the Universal Description, Discovery, and Integration, or "UDDI", registry), where this taxonomy data leverages spatial extenders within spatially-enabled databases. Built-in functions of a spatially-enabled object relational database system can then be used for entries in the network-accessible registry.

17 Claims, 15 Drawing Sheets

FIG. 4

```
<xsd:element name="businessEntity">
  <xsd:complexType>
    <xsd:sequence>
      <xsd:element ref="discoveryURLs" minOccurs="0"/>
      <xsd:element ref="name"/>
      <xsd:element ref="description" minOccurs="0" maxOccurs="unbounded"/>
      <xsd:element ref="contacts" minOccurs="0"/>
      <xsd:element ref="businessServices" minOccurs="0"/>
      <xsd:element ref="identifierBag" minOccurs="0"/>
      <xsd:element ref="categoryBag" minOccurs="0"/>
    </xsd:sequence>
    <xsd:attribute name="businessKey" type="xsd:string" use="required"/>
    <xsd:attribute name="operator" type="xsd:string"/>
    <xsd:attribute name="authorizedName" type="xsd:string"/>
  </xsd:complexType>
</xsd:element>
```

```
<xsd:element name="businessService">
<xsd:complexType>
<xsd:sequence>
<xsd:element ref="name"/>
<xsd:element ref="description" minOccurs="0" maxOccurs="unbounded"/>
<xsd:element ref="bindingTemplates"/>
<xsd:element ref="categoryBag" minOccurs="0"/>
</xsd:sequence>
<xsd:attribute name="serviceKey" type="xsd:string" use="required"/>
<xsd:attribute name="businessKey" type="xsd:string"/>
</xsd:complexType>
</xsd:element>
```

```
<xsd:element name="bindingTemplate">
 <xsd:complexType>
  <xsd:sequence>
   <xsd:element ref="description" minOccurs="0" maxOccurs="unbounded"/>
   <xsd:choice>
    <xsd:element ref="accessPoint" minOccurs="0" maxOccurs="1"/>
    <xsd:element ref="hostingRedirector" minOccurs="0" maxOccurs="1"/>
   </xsd:choice>
   <xsd:element ref="tModelInstanceDetails"/>
  </xsd:sequence>
  <xsd:attribute name="bindingKey" type="xsd:string" use="required"/>
  <xsd:attribute name="serviceKey" type="xsd:string"/>
 </xsd:complexType>
</xsd:element>
```

FIG. 7

```
<xsd:element name="tModel">
  <xsd:complexType>
    <xsd:sequence>
      <xsd:element ref="name"/>
      <xsd:element ref="description" minOccurs="0" maxOccurs="unbounded"/>
      <xsd:element ref="overviewDoc" minOccurs="0"/>
      <xsd:element ref="identifierBag" minOccurs="0"/>
      <xsd:element ref="categoryBag" minOccurs="0"/>
    </xsd:sequence>
    <xsd:attribute name="tModelKey" type="xsd:string" use="required"/>
    <xsd:attribute name="operator" type="xsd:string"/>
    <xsd:attribute name="authorizedName" type="xsd:string"/>
  </xsd:complexType>
</xsd:element>
```

```
<xsd:element name="identifierBag">
 <xsd:complexType>
  <xsd:sequence>
   <xsd:element ref="keyedReference" minOccurs="0" maxOccurs="unbounded"/>
  </xsd:sequence>
 </xsd:complexType>
</xsd:element>
```

FIG. 9

```
<xsd:element name="keyedReference">
 <xsd:complexType>
  <xsd:attribute name="tModelKey" type="xsd:string"/>
  <xsd:attribute name="keyName" type="xsd:string" use="required"/>
  <xsd:attribute name="keyValue" type="xsd:string" use="required"/>
 </xsd:complexType>
</xsd:element>
```

FIG. 10

```
1000
<businessEntity
  businessKey="A#1">
<name>IBM Corporation</name>
...
<identifierBag>
  <keyedReference
    tModelKey="uuid:11112222-3333-4444-5555-666677778888"
    keyName="Dun & Bradstreet number"
    keyValue="123456789"/>
  <keyedReference
    tModelKey="uuid:22222222-3333-4444-5555-666677778888"
    keyName="US Tax Identifier"
    keyValue="12-3456789"/>
  <keyedReference
    tModelKey="uuid:11111111-3333-4444-5555-666677778888"
    keyName="NAICS classification"
    keyValue="123"/>
</identifierBag>
</businessEntity>
```

1010 — businessEntity / businessKey="A#1"
1020 — <name>IBM Corporation</name>
1030 — <identifierBag>
1031 — <keyedReference ... "Dun & Bradstreet number" ...>
1032 — <keyedReference ... "US Tax Identifier" ...>
1033 — <keyedReference ... "NAICS classification" ...>

FIG. 11

```
<xsd:element name="categoryBag">
  <xsd:complexType>
    <xsd:sequence>
      <xsd:element ref="keyedReference" minOccurs="0" maxOccurs="unbounded"/>
    </xsd:sequence>
  </xsd:complexType>
</xsd:element>
```

FIG. 13

```
<categoryBag>
  <keyedReference
    tModelKey="uuid:12345678-1111-2222-3333-444455556666"
    keyName="categorizeComputers"
    keyValue="123125"/>
</categoryBag>
```

FIG. 15A

```
         <businessServices>
1500      <businessService>
           ┌ <name>Acme Service Number 1</name>
           │ <description xml:lang="en">
1502       │ Package Delivery Scheduler
           └ </description>
            <bindingTemplates>
           ┌ <bindingTemplate>
           │  <accessPoint URLType="https">
           │  https://www.Acme.com/packageDelivery.html
           │  </accessPoint>
1504       │  <tModelInstanceDetails>
           │   <tModelInstanceInfo tModelKey="UUID:...">
           │   </tModelInstanceInfo>
           │  </tModelInstanceDetails>
           └ </bindingTemplate>
            </bindingTemplates>

┌ <categoryBag>
           │  <keyedReference
           │   tModelKey="UUID:..."
           │   keyName="UNSPSC: Software" KeyValue="01.02.03.04.05"/>
1510       │  <keyedReference
           │   tModelKey="UUID:..."
           │     keyName="urn: categorizeComputers.sample:taxonomies:Zone7"
           │     keyValue="1235"/>
           └ </categoryBag>

┌ <categoryBag>
           │  <keyedReference
           │   tModelKey="UUID:..."
           │   keyName="NAICS" KeyValue="1231"/>
1520       │  <keyedReference
           │   tModelKey="UUID:..."
           │     keyName="urn: categorizeComputers.sample:taxonomies:Area7"
           │     keyValue="1234"/>
           └ </categoryBag>

</businessService>
```

FIG. 15B

```
1550 <businessService>
        <name>Acme Service Number 2</name>
        <description xml:lang="en">
1552    Package Tracking Service
        </description>
       <bindingTemplates>
         <bindingTemplate>
          <accessPoint URLType="https">
           https://www.Acme.com/packageTracking.html
          </accessPoint>
1554      <tModelInstanceDetails>
           <tModelInstanceInfo tModelKey="UUID:...">
           </tModelInstanceInfo>
          </tModelInstanceDetails>
         </bindingTemplate>
       </bindingTemplates>

<categoryBag>
          <keyedReference
          tModelKey="UUID:..."
          keyName="UNSPSC: Software" KeyValue="01.02.03.04.05"/>
          <keyedReference
           tModelKey="UUID:..."
1560            keyName=" urn: categorizeComputers.sample:taxonomies:Area7"
           keyValue="1234"/>
          <keyedReference
           tModelKey="UUID:..."
              keyName=" urn: categorizeComputers.sample:taxonomies:Mid"
              keyValue="1236"/>
         </categoryBag>
        </businessService>

</businessServices>
```

IMPLEMENTING GEOGRAPHICAL TAXONOMY WITHIN NETWORK-ACCESSIBLE SERVICE REGISTRIES USING SPATIAL EXTENSIONS

BACKGROUND OF THE INVENTION

1. Field of the Invention

The present invention relates to computer programming, and deals more particularly with techniques for using geographical taxonomy data with spatial extensions (e.g., as extensions to an object-relational database) to facilitate programmatically locating information in network-accessible service registries.

2. Description of the Related Art

Network-accessible service registries are known in the art, and may be queried to programmatically locate registered services. A registry which is currently being deployed is referred to as the Universal Description, Discovery, and Integration (or "UDDI") registry. The term "UDDI" is also used more generally to refer to the registry and/or to the specification defining the registry and its associated access techniques. As stated on the Internet home page of the standards group defining the UDDI specification, "UDDI is the building block that will enable businesses to quickly, easily and dynamically find and transact business with one another using their preferred applications.". (See http://www.uddi.org for more information on UDDI. The UDDI specification may be found at http://www.uddi.org/specification.html.)

UDDI registries are designed for use with so-called "Web services" technology. Web services technology is a mechanism which is known in the art for distributed application integration in client/server networks such as the World Wide Web. Many industry experts consider the service-oriented Web services initiative to be the next evolutionary phase of the Internet. With Web services, distributed network access to software will become widely available for program-to-program operation, without requiring intervention from humans. Web services technology is also commonly referred to as the "service-oriented architecture" for distributed computing.

In general, a "Web service" is an interface that describes a collection of network-accessible operations. Web services fulfill a specific task or a set of tasks. They may work with one or more other web services in an interoperable manner to carry out their part of a complex workflow or a business transaction. For example, completing a complex purchase order transactions may require automated interaction between an order placement service (i.e., order placement software) at the ordering business and an order fulfillment service at one or more of its business partners. As another example, when an on-line retailer accepts a customer's order for goods, the order completion process may include programmatically selecting a delivery service to deliver the goods to the customer, such that the customer can be provided with delivery tracking information as part of his order confirmation.

Web services are generally structured using a model in which an enterprise providing network-accessible services publishes the services to a network-accessible registry (referred to herein as a UDDI registry, for purposes of illustration only), and other enterprises needing services are able to query the registry to learn of the services' availability. The participants in this computing model are commonly referred to as (1) service providers, (2) service requesters, and (3) service brokers. These participants, and the fundamental operations involved with exchanging messages between them, are illustrated in FIG. 1. The service providers 100 are the entities having services available, and the registry to which these services are published 110 is maintained by a service broker 120. The service requesters 150 are the entities needing services and querying 140 the service broker's registry. When a desired service is found using the registry, the service requester dynamically binds 130 to the located service provider in order to use the service. The binding occurs using service information which is conveyed in a platform-neutral format.

The operations illustrated in FIG. 1 are designed to occur programmatically, without human intervention, such that a service requester can search for a particular service and make use of that service dynamically, at run-time.

When searching a network-accessible registry for a network-accessible service, it may happen that more than one candidate service is located. For example, if an on-line retailer is searching for a delivery service with which to programmatically schedule delivery of a customer's order, a number of delivery services may be located, including the postal service and package delivery services offered by private companies. It is then necessary to select from among the candidates. Any number of criteria may be used, which may vary widely. For example, when searching for a fee-based service, the cost of the service may be used to rank the candidates. As another example, the reputation and/or name recognition of the service provider may be an important factor in the selection process. As yet another example, the geographic location of the service provider, or the geographic boundaries in which the service is available, may be important.

Service providers are allowed to "tag" entries they publish in a registry with information that allows the published entry to be categorized. The categorization may follow any number of different taxonomies or classification schemes. The tags on the entries can then be used when searching the registry according to values in a taxonomy. (The terms "classification scheme" and "taxonomy" are used interchangeably herein.)

Taxonomies are typically structured as multi-level hierarchies in which successively-deeper levels of the hierarchy provide more granularity or refinement of information. For example, suppose a product-based taxonomy defines the value "123" as representing computers, "1231" as representing computer software, and "1232" as representing computer hardware. The computer software category might be further refined as having a value "12311" for operating system software and "12312" for application software. The "12311" value for operating system software might be further refined (using 6-digit values) to distinguish different operating systems. To locate all operating system software, a search can be carried out using the 5-digit value "12311"; if the searcher is only interested in software for particular operating systems, then the corresponding 6-digit value can be used instead.

One popular classification scheme is the United Nations Standard Products and Services Code, or "UNSPSC"™. UNSPSC defines numeric identifiers for goods and services, where values for different levels of the hierarchy are separated using "." notation. Another popular classification scheme is a "Dun and Bradstreet number", or "D-U-N-S"® number. D-U-N-S numbers are nine-digit identifiers of business entities, and are structured to hierarchically link together the entities within a larger corporate structure. The North American Industry Classification System, or "NAICS", is another classification scheme. It defines 6-digit codes for business sectors in Canada, the United States, and Mexico. A 4-digit industry code is defined by the Standard Industrial Classification, or "SIC", system. International Standard 3166 from the International Organization for Standardization ("ISO"), which is titled "Codes for the representation of names of countries and their subdivisions", defines a geographic taxonomy in which countries of the world are defined using alphabetic abbreviations. Subdivisions or regions within countries are also defined, in some cases, for further refinement. Thus the state of Florida is defined as "US-FL", identifying that this state ("FL") is a region of the United States ("US"). Other geographic classification schemes include the GeoWeb Geographic Classification ("GGC") system, which uses 6-digit values identifying a city, state/region, country, and continent.

UDDI registry entries may include any of these described taxonomies. While existing implementations of UDDI registries support several of these taxonomies, the taxonomy support in UDDI is extensible, and thus the taxonomies that can be referenced within a UDDI registry are not limited to the examples described above.

To maximize exposure of a company's goods and services, the company will likely provide multiple tags when categorizing its entries in a registry. Thus, for example, a package delivery service might provide a tag identifying the D-U-N-S number of the corporate entity and a numeric identifier corresponding to a "package delivery" service category in one of the service-related taxonomies. In fact, it is likely that more than one different identifier will be provided to identify this particular service, using the identifier from each taxonomy in which a package delivery service category is defined. The registry entry for the package delivery service will also likely be tagged with "cross-category" tags (i.e., identifiers of one or more categories which are related to package delivery), to further increase exposure of the company's service. For example, the registry entry may be tagged with an identifier for "shipping" or for "business services", including the possibility for multiple identifiers from multiple taxonomies for each of these related categories.

The volume of data within network-accessible registries is expected to be very large. With multiple tags on the service entries, including the cross-category tags and the duplicated tag values to provide categorization in multiple taxonomies, the search process will be complex. In some cases, available services may be overlooked during a search because a service has been categorized using a value or values in one taxonomy while the search specified a value in another taxonomy. Accordingly, what is needed are techniques for improving categorization in network-accessible registries, thereby enabling improved searching of these registries.

SUMMARY OF THE INVENTION

An object of the present invention is to provide improved categorization techniques for network-accessible registries.

Another object of the present invention is to provide techniques for leveraging spatial extensions for categorizing, and for searching, network-accessible registry entries.

A further object of the present invention is to define techniques for using geographical taxonomies to register data in network-accessible service registries.

Still another object of the present invention is to define techniques to dynamically define and redefine geographical taxonomies.

Yet another object of the present invention is to define techniques which enable efficiently increasing the granularity of search data in network-accessible registries.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving categorization in network-accessible registries. In one aspect, this technique comprises: specifying a geographical taxonomy identifier for an entry to be included in a network-accessible registry; and specifying a classification value for the entry, wherein the classification value is defined with reference to the specified geographical taxonomy identifier, wherein the specified geographical taxonomy identifier and classification value point to a spatially-enabled database.

This technique may further comprise using one or more geographical taxonomy identifiers and classification values to search the network-accessible registry. A search of the network-accessible registry using one or more search criteria may locate at least one entry, and a hashing operation may be performed on data of this located entry to yield an index value. This index value may then be used to access the spatially-enabled database. The access preferably locates a row in the spatially-enabled database, and spatial extensions provided by the spatially-enabled database may be used to operate upon contents of the located row. Rather than accessing the database, the located geographical taxonomy identifier and classification value may alternatively be saved for later use.

Optionally, a compaction process may be performed on the registry. This preferably comprises: determining selected ones of the entries in the network-accessible registry whose geographical taxonomy identifier and classification value are obsolete or no longer needed; and programmatically removing the selected ones from the network-accessible registry. The programmatic removal may be preceded by prompting a user to confirm the removal, and then only continuing with the removal if the user consents.

The network-accessible registry may be, but is not required to be, a UDDI registry.

The entries may be used to register business services, business entities, and/or technical specifications in the network-accessible registry.

The present invention may also be used advantageously in methods of doing business. For example, an implementation of the present invention may be used to improve categorization in network-accessible registries, enabling those registries to offer improved search services. Such improved categorization services may, for example, be marketed as subscription services whereby companies pay a fee for including spatially-extended geographic taxonomy data or as "hit-based" services whereby the registry tracks the number of "hits" made to a registered service through its spatially-extended geographic taxonomy data. As another example, the improved categorization techniques disclosed herein may be used for the dynamic definition and redefinition of trading zones.

The present invention will now be described with reference to the following drawings, in which like reference numbers denote the same element throughout.

BRIEF DESCRIPTION OF THE DRAWINGS

FIGS. 4–7 provide schema definitions of the data types shown in FIG. 2, and

FIGS. 8, 9, and 11 provide schema definitions of supporting data types;

FIG. 10 provides a sample businessEntity element, corresponding to the definition in FIG. 4;

FIG. 13 provides a sample categoryBag element, according to the definition in FIG. 11.

FIGS. 15A and 15B provide sample categorization data, for purposes of illustrating operation of preferred embodiments of the present invention.

DESCRIPTION OF PREFERRED EMBODIMENTS

As discussed earlier, UDDI is an example of a network-accessible registry technique with which businesses may list their services and with which service requesters may find businesses providing particular services. Distributed application integration in client/server networks may be achieved by issuing UDDI requests to locate distributed services through a UDDI registry, and then dynamically binding to the located service. In this manner, service requesters are provided with transparent access to program components which may reside in one or more remote locations. However, the volume of taxonomy information that will be stored in registries is expected to make searching complex, and in some cases otherwise-valid results may be missed in a search because the searcher has used a value or values from one taxonomy while available services that would meet all of the other search criteria have been categorized using values in one or more other taxonomies.

The present invention defines improved techniques for categorizing information in registries. Using the disclosed techniques, the search process can operate more accurately and more efficiently. The UDDI registry, as well as its data structures and access methods, will now be described, and the manner in which preferred embodiments of the present invention operate within this environment will be demonstrated. Note, however, that references to the UDDI registry and to particular data structure formats, notations, and so forth, are provided by way of illustration and not of limitation: the inventive concepts disclosed herein may be used advantageously in other environments, without deviating from the scope of the present invention.

Figure 1:
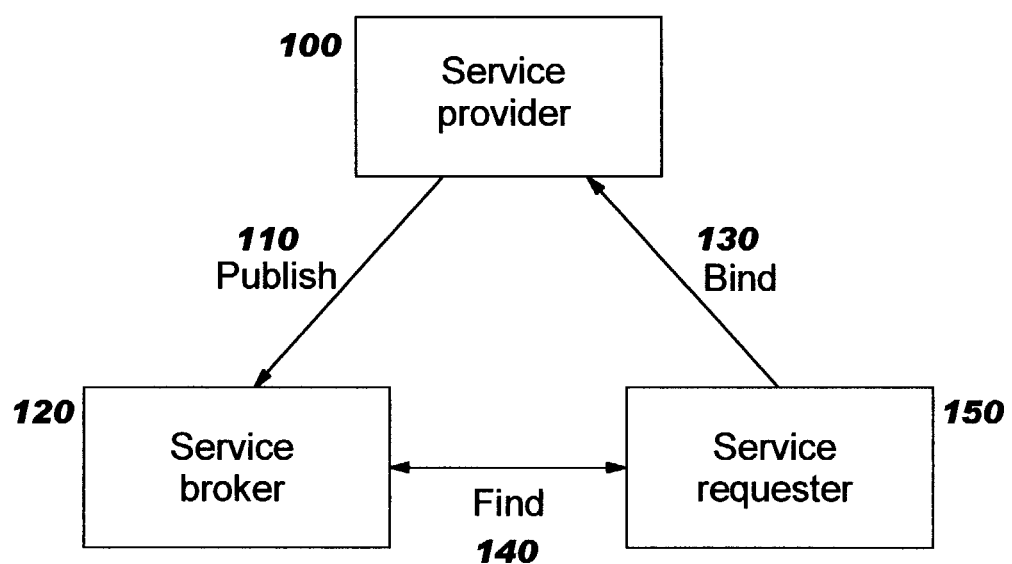
FIG. 1 provides a diagram illustrating the participants and fundamental operations of a service-oriented architecture, according to the prior art.
Figure 2:
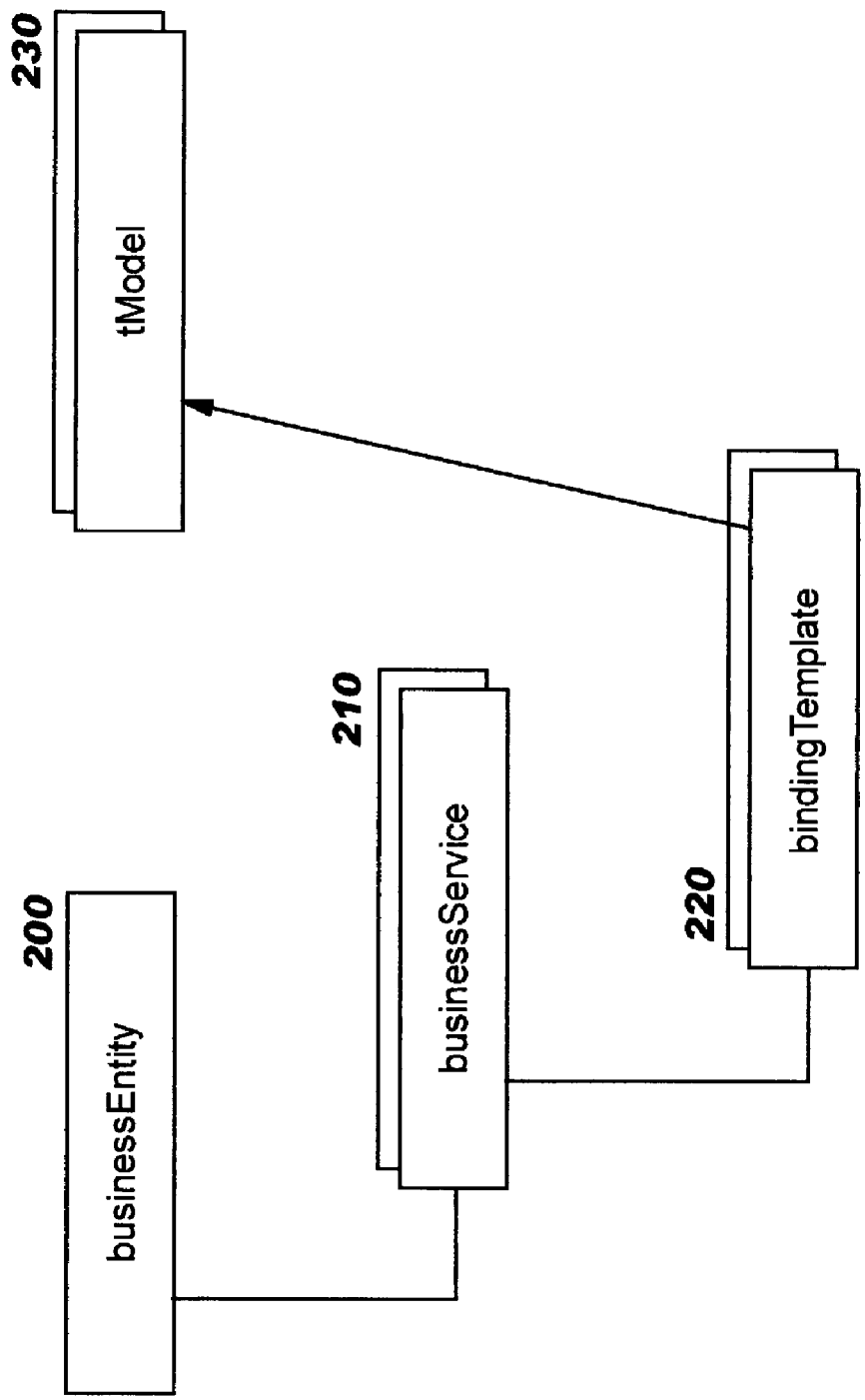
FIG. 2 illustrates several data type structures, and relationships among them, in the UDDI data model of the prior art.

The UDDI registry specification defines several core data type structures, including "businessEntity", "businessService", "bindingTemplate", and "tModel". These data type structures, and relationships among them, are illustrated in FIG. 2. The primary role of the businessEntity data type 200 is to provide information about the entity publishing services in a registry, such as its name and contact information. A particular businessEntity instance may offer (i.e., publish) a number of business services in the registry, where each service is identified using an instance of the businessService data type 210. A businessService instance describes a service type in business terms, including a name for the service, a description for the service, and so forth.

Each businessService instance has an instance of bindingTemplate data type 220 for each way in which a service requester can access (i.e, invoke) the service. A bindingTemplate instance may contain a description, an access point definition which specifies how to call the service (e.g., as a Uniform Resource Identifier, or "URI"), etc. An instance of bindingTemplate may reference one or more instances of tModel data type 230. The primary role of a tModel is to point to a technical definition (i.e., interface specification) for a registered service. The tModels can be used as "technical fingerprints" to identify services. (In addition to bindingTemplates, tModels may also be used in other data structures.)

Figure 3:
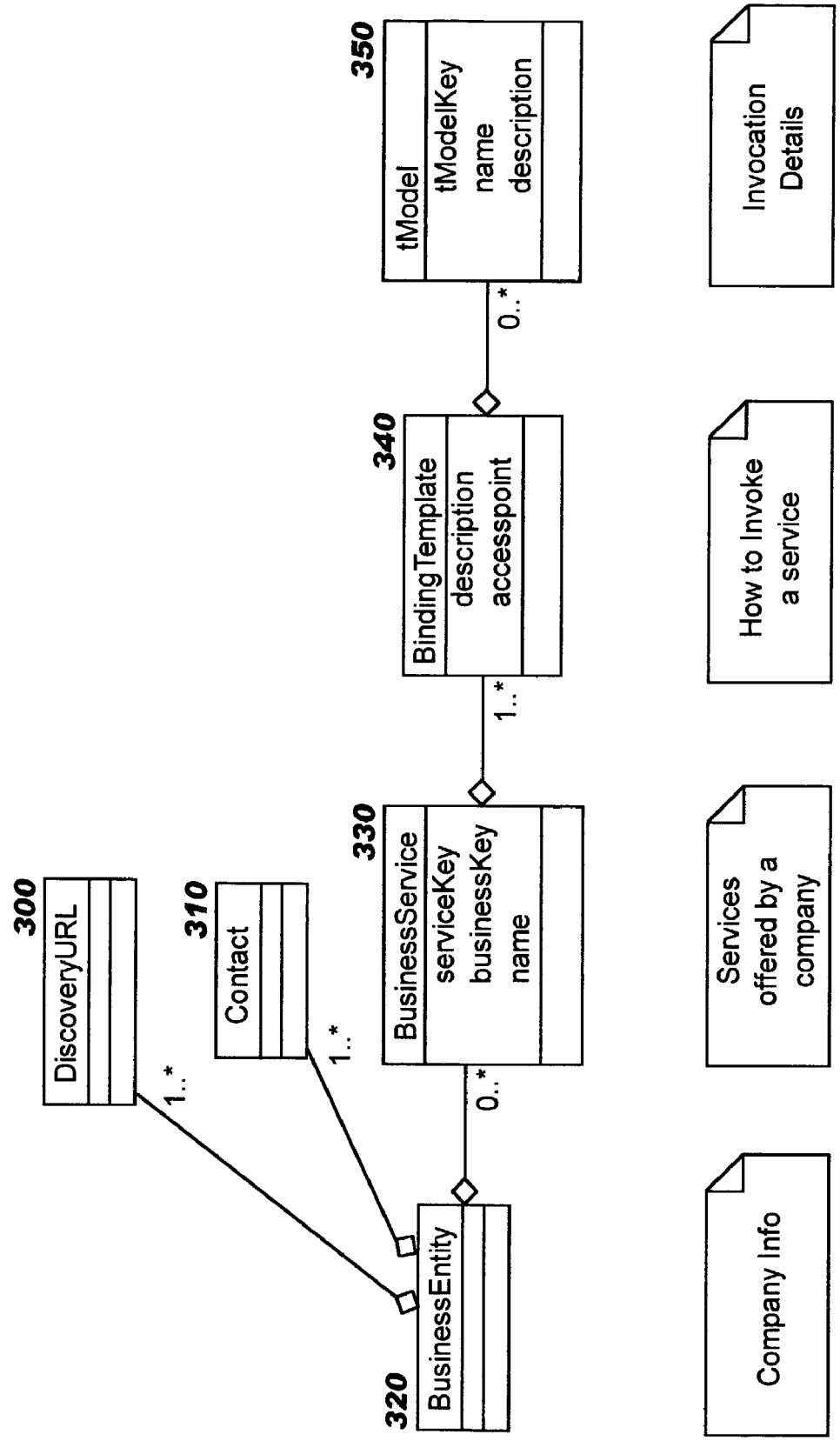
FIG. 3 is a Unified Modeling Language diagram showing how the data types in FIG. 2 are related.

FIG. 3 is a Unified Modeling Language ("UML") diagram showing how instances of the data types in FIG. 2 are related, and provides a more formal definition of the information just described textually. As is known in the art, UML diagrams provide a precise description of the relationship between various entities. (UML is a standard of the Object Management Group, and is described in "UML Toolkit", H. Eriksson, M. Penker, published by John Wiley and Sons, 1997.) Starting with the annotation tags across the bottom of FIG. 3, the purpose of each entity is documented. For example, this UML diagram indicates that each BusinessEntity 320 describes information about the company, and the tModel 350 is described as containing invocation details. The relationship between the entities are also shown. For example, the tModel 350 is associated with the BindingTemplate 340 such that there may be zero to many tModels associated with a single BindingTemplate. In turn, each BusinessService 330 has at least one, and perhaps many, BindingTemplates 340 associated with it.

The entities depicted in FIG. 3 will now be described in more detail. BusinessEntity 320 has a list of URLs that may be used to provide more information about the company (through "DiscoveryURL" instances; see element 300); a list of company contacts 310; and a list of the registered business services 330 offered by the company. For each BusinessService 330, a list of the available invocation descriptions, or BindingTemplates 340, is provided. The binding template may refer to a tModel 350 (or to multiple tModels), thereby implying certain specific and identifiable specifications that are provided. Thus, if an application needs to search for implementors of tModel "xyz", it can look for a binding template with a reference to this tModel.

Values for UDDI data structures are typically expressed using the Extensible Markup Language, or "XML". FIGS. 4–7 provide schema syntax which defines the format of the businessEntity, businessService, bindingTemplate, and tModel data types. (Refer to the UDDI specification for more detailed information about these data types.)

The businessEntity and tModel data types include a placeholder for elements named "identifierBag". See reference numbers 410 of FIG. 4 and 710 of FIG. 7. The schema for an identifierBag is shown in FIG. 8, and comprises one or more "keyedReference" elements, where each of these elements provides an identifier that may be used to identify the businessEntity or tModel. The schema for a keyedReference is shown in FIG. 9. As shown therein, a keyedReference comprises a tModelKey attribute, which is typically specified as a Universal Unique Identifier ("UUID") value; a keyName attribute, which is normally used for readability; and a keyValue attribute, which is used for specifying a value that is interpreted within a particular context. The context is identified by the tModelKey value. These attributes will be discussed in more detail below. (A "UUID" value is a 128-bit value which is guaranteed to be unique across all space and time.)

FIG. 10 provides example data values for an instance of the businessEntity data type. The sample businessEntity specification 1000 describes the IBM Corporation as a publisher of registered information (see reference number 1020 of FIG. 10). Three different identifiers 1031, 1032, and 1033 are provided in the identifierBag 1030 for this business entity. In this example, the business entity named "IBM Corporation" 1020 and having business key value "A#1" 1010 is therefore also identified using its Dun & Bradstreet number 1031, its U. S. tax identifier 1032, and its NAICS classification number 1033.

In the example of FIG. 10, any or all of these identifiers 1031, 1032, 1033 might be used when searching a registry to locate a business entity. Thus, a searcher (e.g., an application program or a search utility) may proceed by first determining the Dun and Bradstreet number for IBM, the U. S. tax identifier for IBM, or the NAICS number for IBM, and then using that value as an argument of the search.

Figure 12:
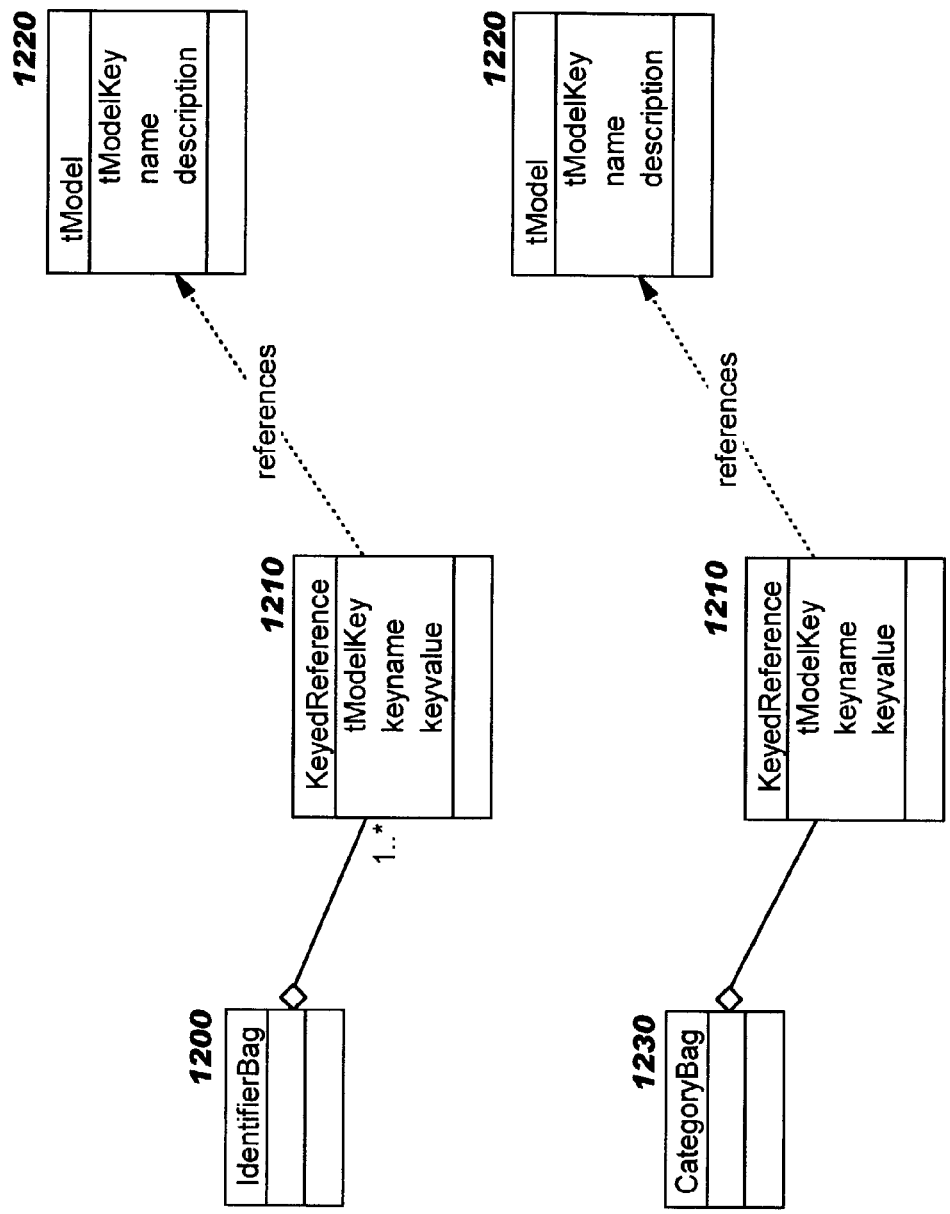
FIG. 12 provides a Unified Modeling Language diagram corresponding to the schema definitions in FIGS. 8, 9, and 11.

In addition to the identifierBag, the businessEntity and tModel data types also include a placeholder for elements named "categoryBag"; the businessService data type includes this placeholder as well. See reference numbers 420 of FIG. 4, 520 of FIG. 5, and 720 of FIG. 7. The categoryBag schema is provided in FIG. 11, and as shown therein, the structure of a categoryBag instance is analogous to the structure of identifierBag (as shown in FIG. 8). FIG. 12 provides UML diagrams for the identifierBag and categoryBag structures, showing that identifierBag 1200 and categoryBag 1230 both contain a list of keyedReference instances 1210, where each keyedReference contains a reference to a tModel instance 1220.

An instance of categoryBag is used to provide the taxonomy values that categorize entries in the network-accessible registry. Similar to identifierBags, a keyedReference element within a categoryBag specifies a "keyValue" attribute that is interpreted in a particular namespace or context, where this context is identified by the corresponding tModelKey value. In the case of categoryBags, that context is a taxonomy used for categorization. Thus, entries in a categoryBag instance may be used to identify the categories with which a registered service (or a business entity or a tModel) is associated.

Referring again to the product-based taxonomy example that included an application software classification of "1231", suppose that the value "123125" identifies network-accessible application software that schedules a package delivery service, and further suppose that these classification values are defined according to a hypothetical taxonomy "categorizeComputers". FIG. 13 shows a sample categoryBag element containing this value "123125" as the value of the keyValue attribute of a keyedReference. This value "123125" derives meaning by virtue of the particular taxonomy with which it is associated. Thus, while it signifies package delivery scheduling software in the hypothetical taxonomy, a value of "123125" might represent completely different services in other taxonomies, such as dentistry services in one taxonomy and florist services in yet another.

For the example interpretation, when the sample categoryBag in FIG. 13 is specified as part of a businessService entry in the UDDI registry, this is an indication that this businessService pertains to network-accessible package delivery scheduling software. The provider of the service might also want to associate the service with other categories. Suppose that value "4567" represents "services available from Acme Computer Co." in the hypothetical taxonomy. Then, in addition to the keyedReference element shown in FIG. 13, another keyedReference element having its keyValue attribute set to "4567" might be specified in the businessService element where Acme Computer Co. registers its package delivery scheduling software.

A search for package delivery scheduling software using the value "123125" will then locate Acme's service, and so will a search for Acme's services using the value "4567". It is anticipated that service providers will specify multiple keyedReference elements in a categoryBag, as in this example, to maximize the likelihood that a search will locate their registered service.

A businessService instance may also be categorized according to values from more than one taxonomy. Suppose, for example, that a completely different taxonomy also specifies values for computers and network-accessible package delivery scheduling software, perhaps using the value "14.15", where 14 corresponds to computers and 15 corresponds to package delivery scheduling software. If a keyedReference is not specified within a categoryBag according to this taxonomy, Acme's software will be overlooked on searches that are based on this taxonomy. The sample key values in this example have been chosen to emphasize that the values from the different taxonomies may be completely unrelated, yet still describe the same service.

As another example of using values in multiple taxonomies for a particular businessService instance, suppose that Acme Computer wants its scheduling software to be found if a search is performed for "all services based in Computer City, NY, U.S.A.", where Acme's facilities are located. If the GGC value for Computer City is "654321", then Acme can register its software under the GGC taxonomy by including an additional keyedReference element that identifies (via its tModelKey) the GGC taxonomy, where this keyedReference element specifies the value "654321" for the keyValue attribute. (Note that when multiple keyedReference elements are specified, they may be in a single categoryBag or in more than one categoryBag.)

Acme's software can then be found by searches using two alternative values in the categorizeComputers taxonomy as well as by a search using the GGC value. However, suppose the search uses an ISO 3166 value of "US-NY", to find all services registered as being associated with the state of New York. This search will overlook Acme's registered service. To avoid this undesirable result, publishers are likely to register their services with a large number of categorizations, which in turn will lead to slower searching.

The present invention avoids these problems of the prior art by defining geographical taxonomy data that leverages spatial extenders within spatially-enabled databases. A brief description of spatially-enabled databases will now be provided.

Geographic information systems are known in the art, and store geographic or cartographic (i.e., map-oriented) data. Systems are also known in the art for using relational databases to process (e.g., store and access) this type of geographic data. When a relational database is adapted for use with geographic information system ("GIS") data, the database is often referred to as "spatially-enabled".

Geographic data pertains to physical locations, and when using 2 dimensions, is typically expressed in terms of latitude and longitude. The latitude and longitude values for a particular location are given relative to fixed points of reference, using a coordinate system in which a latitude value represents an offset from the equator and a longitude value represents an offset from the prime meridian.

Geographic data may describe the physical location or area of a place or thing, or even the location of a person. When geographic data is stored in a spatially-enabled database, it is stored using a geometric model in which locations/areas are expressed in terms of geometric shapes or objects. The geometric data stored according to this model may also be referred to as "spatial data". In addition to locations or areas of geographic objects, spatial data may also represent relationships among objects, as well as measurements or distances pertaining to objects. As an example of relationships among objects, spatial data may be used to determine whether a geometric shape corresponding to the location of a particular bridge intersects a geometric shape corresponding to the location of a river (thus determining whether the bridge crosses the river). As an example of using spatial data for measurements or distances, the length of a road passing through a particular county could be determined using the geometric object representing the road and a geometric object which specifies the boundaries of the county.

Spatial data values are expressed in terms of "geometry" or "geometric" data types. Thus, the location of a landmark might be expressed as a point having (x,y) coordinates, and the perimeter of a lake might be defined using a polygon. Typical spatially-enabled database systems support a set of basic geometry data types and a set of more complex geometry data types, where the basic types comprise points, line strings, and polygons, and the complex types comprise collections of points, collections of line strings, and collections of polygons.

Figure 14:
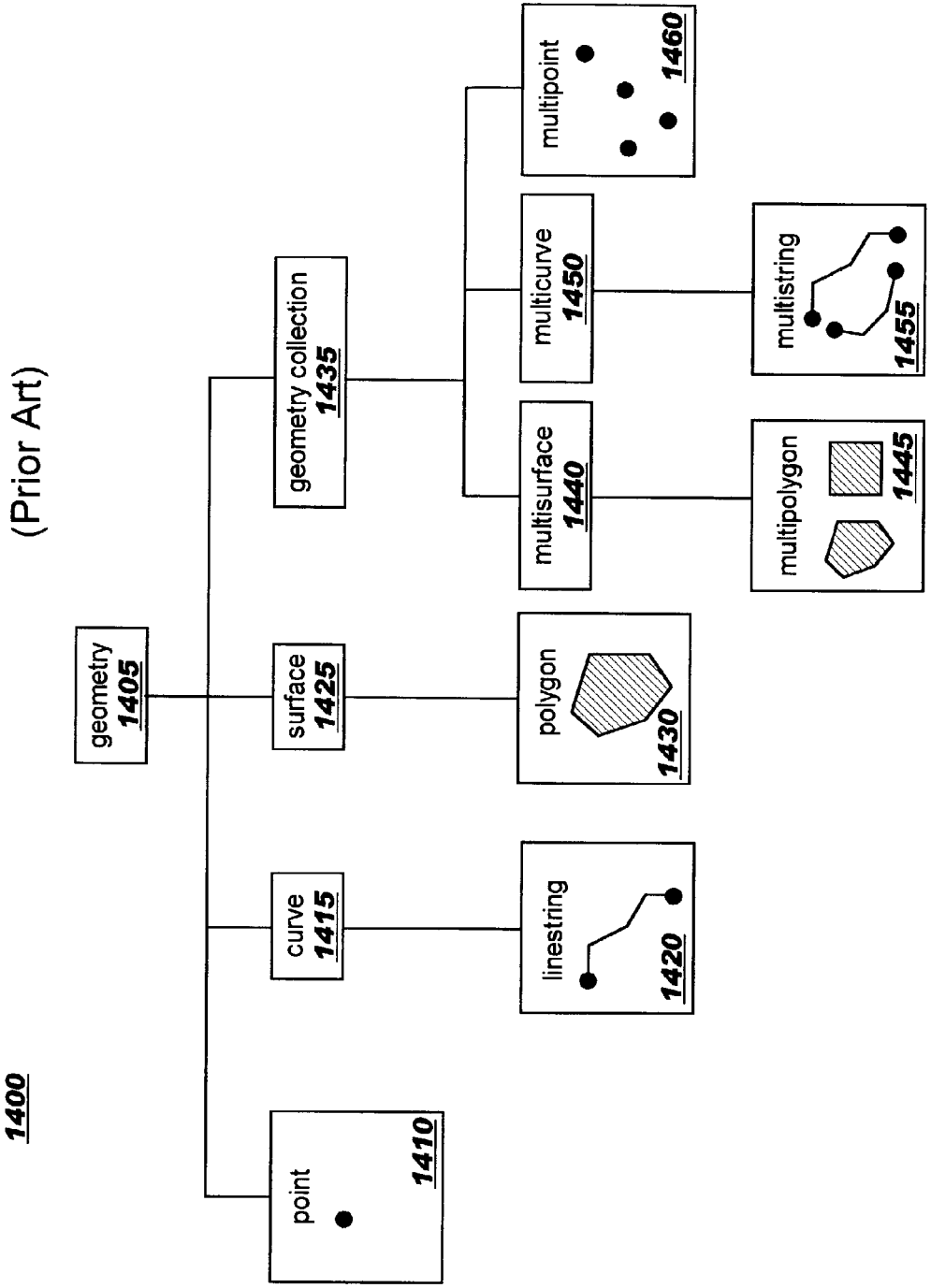
FIG. 14 illustrates a common geometric model used by spatially-enabled database systems, according to the prior art.

A common geometric model used by spatially-enabled database systems is shown in FIG. 14. As shown therein, the model is structured as a hierarchy or tree 1400 having geometry 1405 as its root, and having a number of subclasses. Point 1410, linestring 1420, and polygon 1430 represent the basic geometry data types. In this model 1400, linestring 1420 is a subclass of curve 1415, and polygon 1430 is a subclass of surface 1425. Geometry collection class 1435 is the root of a subtree representing the more complex geometric data types, and each subclass thereof is a homogeneous collection. Multipolygon 1445, multistring 1455, and multipoint 1460 represent the collections of polygons, line strings, and points, respectively. Multipolygon 1445 is a subclass of multisurface 1440 in this model, and multistring 1455 is a subclass of multicurve 1450. Only the classes which are leaves of this tree 1400 (i.e., 1410, 1420, 1430, 1445, 1455, and 1460) are instantiable in typical spatially-enabled database systems; the other nodes correspond to abstract classes. (Each of these entities is an actual data type.)

Referring now to the basic data types in particular, geometric data according to the model 1400 of FIG. 14 may be expressed in terms of a single point having (x,y) coordinates, or may be described as a line string or a polygon. A line string may be considered as one or more line segments which are joined together, and is defined using an ordered collection of (x,y) coordinates (i.e. points) that correspond to the endpoints of the connected segments. A polygon is defined using an ordered collection of points at which a plurality of line segments end, where those line segments join to form a boundary of an area.

Many different examples may be imagined where points, line strings, and polygons can be used for describing locations or areas. A point might represent the location of a landmark such as a house or a building, or the intersection of two streets. A line string might be used to describe a street, or the path of a river or power line, or perhaps a set of driving directions from one location to another. A polygon might be used to describe the shape of a state or city, a voting district, a lake, or any parcel of land or body of water.

Once spatial information has been stored in a database, the database can be queried to obtain many different types of information, such as the distance between two cities, whether a national park is wholly within a particular state, and so forth.

As one example of a spatially-enabled database, a feature known as "Spatial Extender" can be added to IBM's DB2® relational database product to provide GIS support. Spatial Extender provides support for the geometric data types shown in FIG. 14, and provides a number of built-in functions for operating on those data types. When using Spatial Extender, spatial data can be stored in columns of spatially-enabled database tables by importing the data or deriving it. The import process uses one of several input formats (such as text or binary data, the details of which are not pertinent to the present invention), and processes that data using built-in functions to convert it to geometric data. Spatial data may be derived either by operating on existing geometric data (for example, by defining a new polygon as a function of an existing polygon) or by using a process known as "geocoding". A geocoder is provided with Spatial Extender that takes as input an address in the United States and derives a geometric point representation. Other geocoders can be substituted to provide other types of conversions.

Returning now to the detailed description of the present invention, preferred embodiments of the present invention leverage a DB2® object relational database system in which the Spatial Extender feature has been installed to provide spatial data support. (An implementation of the present invention may leverage another database system which provides analogous support, without deviating from the scope of the present invention.) Refer to "IBM® DB2® Spatial Extender User's Guide and Reference", Version 7.2, published by IBM as IBM publication SC27-0701-01 (July 2001), for more information on Spatial Extender. This User's Guide is hereby incorporated herein as if set forth fully, and is hereinafter referred to as the "Spatial Extender User's Guide". ("IBM" and "DB2" are registered trademarks of IBM.)

UDDI provides for taxonomies, such as the D-U-N-S, ISO 3166, and GGC taxonomies, to be registered. Any keyedReference element can then refer to these taxonomies using their registered tModelKey (UUID) value. However, UDDI also provides a less formal way to use taxonomies, through a "general_keywords" taxonomy. This taxonomy was designed for use with categorizations for which the overhead of formal registration and using registered values is thought to be excessive. Preferred embodiments of the present invention leverage this general_keywords taxonomy for categorizing business services in a novel manner, providing references to geospatial data in a spatially-enabled database (or in more than one spatially-enabled database).

Alternatively, a taxonomy that supports references to geospatially-enabled databases might be registered, in which case the standard UDDI types taxonomy may then be used with embodiments of the present invention.

As an example of categorizing a registered service according to the present invention, suppose that a geospatially-enabled database contains an entry specified using the polygon 1430 data type, where this polygon defines the boundary of Computer City, NY. Or, the database might contain an entry specified using the point 1410 data type, where this point represents the town of Computer City. A keyvalue attribute that resolves to this polygon or point, as appropriate, can then be used to associate Acme's scheduling software with Computer City. A search for registered services from this geography can then be conducted.

In addition to using points or polygons to define the boundary of a city, additional or different types of geographic entities can be associated with a registered service using these or other geometric data types. For example, a search might be conducted to locate all registered package delivery services operating within the state of New York, and when the services have specified a keyedReference whose value resolves to the state in which they operate, the set of services within New York can be efficiently determined. Other functions which are available through spatially-enabled databases can then be used as well, for example to efficiently compute the distance between a customer location and the available drop-ship locations for a customer's order.

For the standard UDDI types taxonomy, values of the keyName attribute within a keyedReference element serve only descriptive purposes. However, when using the general_keywords taxonomy, the keyName attribute takes on additional meaning. In particular, the keyName identifies the set of values from which the value of the keyvalue attribute is taken. Therefore, according to the UDDI specification, a keyName value is preferably specified as a Uniform Resource Name ("URN") when using the general_keywords taxonomy, and care should be taken to avoid name collisions.

While it is known in the art to use the general_keywords taxonomy for categorizing entries using unregistered taxonomies, it is not known in the art to define a geographical taxonomy that leverages spatial extenders within spatially-enabled databases for use within network-accessible registries, nor is it known to specify keyedReference elements using taxonomies that refer to spatially-enabled databases or that leverage spatial extensions, and it is therefore not known to perform searches of network-accessible registries using geospatial data values or references thereto.

FIGS. 15A and 15B show sample categorization data, for purposes of illustrating operation of preferred embodiments of the present invention. In this example, a business entity has registered two services, specifying a businessService element for each service. See reference numbers 1500 and 1550. The first registered service is named "Acme Service Number 1", and is described as "Package Delivery Scheduler". See reference number 1502. The second registered service is named "Acme Service Number 2", and is described as "Package Tracking Service". See reference number 1552. Each registered service includes a binding template. See reference numbers 1504 and 1554. The access points specified therein might identify the location of a Web page for this service, for example. Each service also includes a tModelInstanceInfo element, having a tModelKey reference (a UUID) that points to a tModel where the implementation details of this service are described.

The first registered service includes two categoryBag elements 1510, 1520, each of which has keyedReference elements that categorize this service with reference to multiple taxonomies, including prior art taxonomies and geographical taxonomies as disclosed herein. The second registered service includes a single categoryBag element 1560, and in the example, is being categorized with reference to a prior art taxonomy and two geographical taxonomies (one of which is also used in categoryBag 1520). These categoryBag elements will now be described in more detail.

The first categoryBag 1510 includes a first keyedReference element categorizing this service with reference to the UNSPSC taxonomy, and a hypothetical sub-category "Software", in which a hypothetical category value of "01.02.03.04.05" is associated with this registered service. (The value of the tModelKey is a UUID that points to the tModel for the UNSPSC taxonomy.) This is an example of a prior art categorization. A second keyedReference element in this categoryBag 1510 specifies its value with reference to a geographical taxonomy, according to the present invention. In this example, the geographical taxonomy is identified by its URN "categorizeComputers.sample:taxonomies:Zone7". In this taxonomy, the service has a categorization value of "1235". So, for example, the taxonomy " . . . Zone7" might be used for categorizing locations within the United States Department of Agriculture ("USDA") plant hardiness zone number 7, where the value "1235" might identify a particular subdivision of that zone. According to the present invention, this taxonomy name and its associated value then point to a geometric data type in a spatially-enabled database, where the geometric data type preferably provides a description of an associated location. (USDA plant hardiness zones identify irregularly-shaped bands across the United States.)

The second categoryBag 1520 includes a categorization value of "1231" in the NAICS taxonomy, which is an example of a prior art categorization of this service. This categoryBag 1520 also includes a categorization of the type disclosed herein, where the value "1234" is associated with this service according to the classification scheme identified using the URN "categorizeComputers.sample:taxonomies:Area7". This " . . . Area7" taxonomy may specify some arbitrary geographic classification system, and the value "1234" within this system is associated with the registered service by inclusion of this keyedReference element.

For the second business service, shown in FIG. 15B, the single categoryBag 1560 includes three keyedReference elements, categorizing this service in three different ways. First, the UNSPSC Software category is used again, where this second service 1550 is also associated with the value "01.02.03.04.05". Thus, in the hypothetical categorization, both service 1500 and service 1550 are identified as pertaining to software. CategoryBag 1560 next uses the " . . . Area7" taxonomy, which was also used in categoryBag 1520, and in this taxonomy the second service is associated with the value "1234". Accordingly, both service 1500 and service 1550 are identified as belonging to the same category "1234" in this " . . . Area7" taxonomy. Finally, a different geographical taxonomy, identified as "urn:categorizeComputers.sample:taxonomies:Mid" is used in categoryBag 1560, and service 1550 is associated with the value "1236" in that taxonomy.

When a service requester performs a search over these categoryBag elements using the value "1231" (which, for purposes of illustration, is assumed to identify software-related entries in the registry, with reference to the NAICS taxonomy), a search would locate only the first service (via its categoryBag 1520). When the present invention is used, both the first and the second service will be located if using the general_keyword taxonomy " . . . Area7" and the keyValue "1234". Searches using the other specified taxonomies and taxonomy values will also locate one or both of these registered services.

According to preferred embodiments, when a keyValue element from a keyedReference is located, a hashing operation is performed on that keyValue to determine an index to use when accessing a spatially-enabled database for a geographical taxonomy. It may happen that values from more than one taxonomy will hash to the same index value. In this case, the keyedReference elements (regardless of their taxonomy) will identify the same row in the database. Thus, it can be determined that these distinct values represent the same information. Furthermore, once a service requester (i.e., an application or utility) has located the keyValue, it can save this value and/or use it directly to access the hashing function and thus obtain an index to use for retrieving data from the spatially-enabled database.

Figure 16:
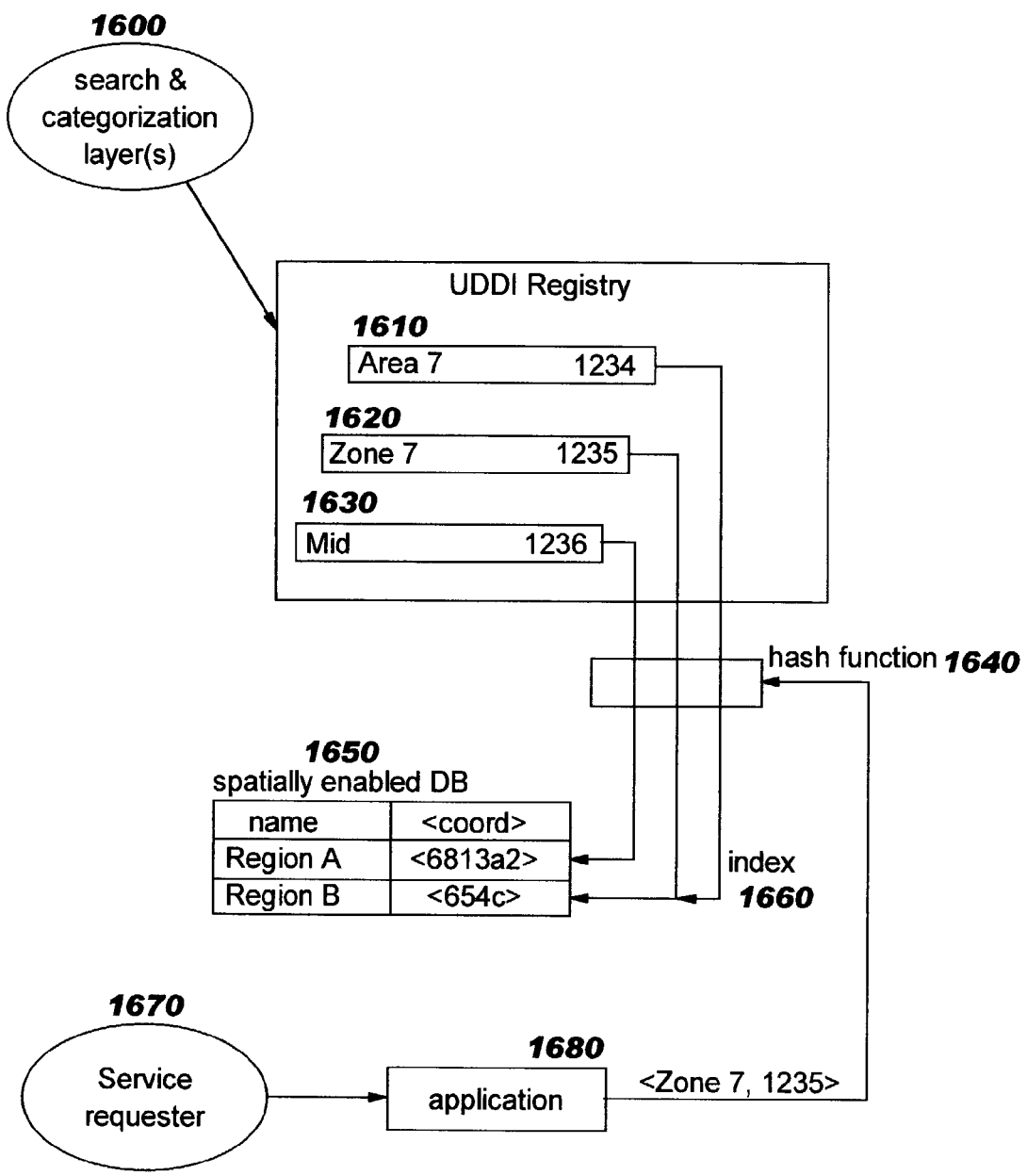
FIG. 16 illustrates how categorization data created according to preferred embodiments maps onto a spatially-enabled database.

See FIG. 16, which pictorially demonstrates how several keyvalue attributes stored in keyedReference elements (identified at reference numbers 1610, 1620, and 1630) are resolved. Each keyValue is passed through a hash function 1640, which generates an index 1660 into a spatially-enabled database 1650. In this example, the value "1234" within the " . . . Area7" taxonomy (see reference number 1610) and the value "1235" within the " . . . Zone7" taxonomy (see reference number 1620) both resolve to an index value which points to the second row of the database 1650, and the value "1236" within the " . . . Mid" taxonomy (see reference number 1630) points to the first row of this database 1650. Thus, these taxonomy references identify the coordinates of sample "Region A" and "Region B" rows. A service requester 1670, rather than requesting a search, might already have located the value "1235" from " . . . Zone7", and an application 1680 may therefore pass this information directly to the hash function 1640 (bypassing the search and categorization layers 1600, that is).

An advantage of using the geographical taxonomy data as disclosed herein is that multiple names for a particular geometric data type can be used within the keyedReference elements, and these can be resolved automatically. Thus, fewer entries can be used in the categoryBags. For example, the publisher of service 1500 only needs to include a keyedReference element specifying the keyValue of 1235 within the " . . . Zone7" taxonomy, or the keyValue of 1234 within the " . . . Area7" taxonomy, because both of these identify the same row in the spatially-enabled database. A search using either approach will therefore locate registered service 1500.

This result is made possible by using spatial extensions and hashing/lookup functions, whereby services can be determined to be the same even though they are identified with different categorization values.

In addition to locating registered services within particular geographic boundaries, use of the present invention also facilitates other programmatic functions, including distance calculations, generating maps, calculating costs, making display or presentation choices (e.g., using miles vs. kilometers, as appropriate to a determined geography), and so forth.

The techniques disclosed herein may be used for keyedReference entries that are not strictly associated with business services. For example, categoryBags can be used with businessEntity elements and tModel elements, in addition to businessService elements, and thus geographical taxonomies may be used to classify business entities and/or tModels using the techniques of the present invention.

Using the spatial extensions of the present invention, more granular categorization can be provided using less data, and searches can be provided more efficiently and more effectively. The disclosed techniques work within defined and accepted UDDI access specifications, and extend existing categorization techniques in an advantageous manner. In this manner, creation of unique, ill-defined taxonomies can be avoided. Existing relational database technology can be leveraged for data normalization and data management. The spatial extensions, geometric data types, grid indexing functions, user-defined functions, and built-in procedures of the database system can also be used. In this manner, operations on the stored data can use optimized built-in functions of the database system, rather than requiring an applications programmer to provide complex code in his/her application. As a result, programmer efficiency is increased and code complexity is reduced, thereby leading to decreased program development and support costs. Furthermore, use of the optimized built-in database functions for interacting with the stored data will typically increase the efficiency of application programs and search utilities.

Optionally, a compaction process may be performed on the businessService categoryBags, whereby keyedReference elements that have not been used recently are purged from the registry.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications may occur to those skilled in the art once they learn of the basic inventive concepts. In particular, while preferred embodiments have been described with reference to a UDDI registry, this is for purposes of illustration only. Therefore, it is intended that the appended claims shall be construed to include the preferred embodiments and all such variations and modifications as fall within the spirit and scope of the invention.

What is claimed:

1. A method of improving categorization in network-accessible service registries, comprising steps of:
   specifying, in an entry that represents a network-accessible service in a network accessible service registry, an identifier of a geographical taxonomy specification; and
   specifying a classification value in the entry, wherein the classification value categorizes the network-accessible service in context of the specified geographical taxonomy specification,
   wherein the specified geographical taxonomy identifier and classification value point to a row in a spatially-enable database by applying a hash function, wherein the pointed-to-row comprises geospatial data related to the network-accessible service represented by the entry;
   wherein the network-accessible registry is a Universal Description, Discovery, and Integration registry.

2. The method according to claim 1, wherein the steps of specifying the identifier and specifying the classification value are performed for entries representing a plurality of network-accessible services, and further comprising the step of locating a particular one of the plurality of network-accessible services by searching the network-accessible service registry using a particular geographical taxonomy identifier and classification value.

3. The method according to claim 1, wherein the steps of specifying the identifier and specifying the classification value are performed for entries representing a plurality of network-accessible services, and further comprising the steps of:
   searching the network-accessible service registry according to one or more search criteria, thereby locating at least one geographical taxonomy identifier and its associated classification value; and
   for each located geographical taxonomy identifier and associated classification value, performing the steps of:
      bashing the located geographical taxonomy identifier and classification value to create an index value; and
      accessing the spatially-enabled database using the index value.

4. The method according to claim 1, wherein the steps of specifying the identifier and specifying the classification value are performed for entries representing a plurality of network-accessible service, and further comprising the steps of:
   searching the network-accessible service registry according to one or more search criteria, thereby locating at least one geographical taxonomy identifier and its associated classification value; and
   saving each located geographical taxonomy identifier and classification value for later use in accessing the pointed-to row.

5. The method according to claim 4, further comprising the steps of:
   hashing each saved geographical taxonomy identifier and classification value to create an index value; and
   using each index value to access to corresponding row of the spatially-enabled database.

6. The method according to claim 1, wherein the steps of specifying the identifier and specifying the classification value are performed for entries representing a plurality of network-accessible services, and further comprising the steps of:
   determining selected ones of the entries in the network-accessible service registry whose geographical taxonomy identifier and classification value are obsolete or no longer needed; and
   programmatically removing the determined ones from the network-accessible registry.

7. The method according to claim 6, wherein the step of programmatically removing is preceded by the step of prompting a user to confirm the removal, and then only continuing with the removal if the user consents.

8. The method according to claim 2, wherein at least one of the entries comprises a plurality of geographical taxonomy specification identifiers and classification values, each categorizing the network-accessible service represented by the entry in context of different geographical taxonomies.

9. A system for improving categorization in a network-accessible service registry deployed in a communication network, comprising:
   a plurality of network-accessible service registration entries in the network-accessible service registry, each entry corresponding to a particular network-accessible service registered in the service registry, wherein:
   each entry comprises at least one identifier-value pair associated with the corresponding network-accessible service;
   the identifier in each identifier-value pair identifies a geographical taxonomy and the value in each identifier-value pair categorizes the associated network-accessible service in context of the identified geographical taxonomy; and
   each identifier-value pair points to one of a plurality of rows in a spatially-enabled database by applying a hash function, each pointed-to-row comprising geospatial data corresponding to the service associated with that identifier-value pair;
   means for searching the identifier-value pairs in the entries to locate at least one identifier-value pair matching specified search criteria;
   means for using the identifier and the value in each located identifier-value pair to access the row pointed to by that pair, thereby accessing the geospatial data related to the service associated with that identifier-value pair;
   wherein the network-accessible service registry is a Universal Description, Discovery, and integration registry.

10. The system according to claim 9, wherein the specified search criteria comprises an identifier of a particular geographical taxonomy and a particular value.

11. The system according to claim 9, further comprising means for using spatial extensions provided by the spatially-enabled database to operate upon the geospatial data of at least one accessed row.

12. The system according to claim 9, further comprising:
   means for determining selected ones of the identifier-value pairs that no longer needed;

means for prompting a user to confirm whether the determined ones should be removed from the network-accessible service registry; and means for programmatically removing the determined ones from the network-accessible service registry if the user consents via the means for prompting.

13. The system according to claim 9, wherein the means for searching locates at least two identifier-value pairs that are different yet point to a single row in the spatially-enabled database.

14. A computer program product for improving categorization in network-accessible registries, the computer program product embodied on one or more computer storage media and comprising:

computer-readable program code means for specifying, in an entry that represents a network-accessible service in a network-accessible registry, an identifier of a geographical taxonomy specification; and computer-readable program code means for specifying a classification value in the entry, wherein the classification value categorizes the network-accessible service in context of the specified geographical taxonomy specification, wherein the specified geographical taxonomy identifier and classification value point to a row in a spatially-enable database by applying a hash function, wherein the pointed-to-row comprises geospatial data related to the network-accessible service represented by the entry;

wherein the network-accessible registry is a Universal Description, Discovery, and Integration registry.

15. The computer program product according to claim 14, wherein the computer-readable program code means for specifying the identifier and the computer-readable program code means for specifying the classification value are executed for entries representing a plurality of network-accessible services, and further comprising computer-readable program code means for locating a particular one of the plurality of network-accessible services by searching the network-accessible service registry using a particular geographical taxonomy identifier and classification value.

16. The computer program product according to claim 14, wherein the computer-readable program code means for specifying the identifier and the computer-readable program code means for specifying the classification value are executed for entries representing a plurality of network-accessible services, and further comprising:

computer-readable program code means for searching the network-accessible service registry according to one or more search criteria, thereby locating at least one geographical taxonomy identifier and its associated classification value;

computer-readable program code means for hashing each located geographical taxonomy identifier and classification value, thereby creating an index value for each located geographical taxonomy identifier and classification value; and computer-readable program code means for accessing the spatially-enabled database using each index value.

17. A method of offering improved categorization of a network-accessible service registry, comprising steps of:

allowing specification of a plurality of network-accessible service registration entries in the network-accessible service registry, each entry corresponding to a particular network-accessible service registered in the service registry, wherein:

each entry comprises at least one identifier-value pair associated with the corresponding network-accessible service;

the identifier in each identifier-value pair identifies a geographical taxonomy and the value in each identifier-value pair categorizes the associated network-accessible service in context of the identified geographical taxonomy; and each identifier-value pair points to one of a plurality of rows in a spatially-enabled database by applying a hash function, each pointed-to-row comprising geospatial data corresponding to the service associated with that identifier-value pair;

providing search facilities for the network-accessible service registry, which search the identifier-value pairs in the entries to locate at least one identifier-value pair matching specified search criteria; and providing access facilities for using the identifier and the value in each located identifier-value pair to access the row pointed to by that pair, thereby accessing the geospatial data related to the service associated with that identifier-value pair;

wherein the network-accessible service registry is a Universal Description, Discovery, and integration registry.

* * * * *

UNITED STATES PATENT AND TRADEMARK OFFICE
CERTIFICATE OF CORRECTION

PATENT NO. : 6,976,027 B2
DATED : December 13, 2005
INVENTOR(S) : Robert R. Cutlip It is certified that error appears in the above-identified patent and that said Letters Patent is hereby corrected as shown below:

Column 15,
Line 52, replace "bashing" with -- hashing --.

Column 16,
Line 67, insert -- are -- between "that" and "no".

Column 17,
Line 17, insert -- service -- between "network-accessible" and "registry".

Signed and Sealed this

Twenty-first Day of March, 2006

JON W. DUDAS
*Director of the United States Patent and Trademark Office*